United States Patent [19]

Kurita

[11] 4,237,009
[45] Dec. 2, 1980

[54] FILTRATION-COMPRESSION TYPE FILTER PRESS

[75] Inventor: Tetsuya Kurita, Takarazuka, Japan

[73] Assignee: Kurita Machinery Manufacturing Company Limited, Osaka, Japan

[21] Appl. No.: 964,165

[22] Filed: Nov. 28, 1978

Related U.S. Application Data

[63] Continuation-in-part of Ser. No. 857,757, Dec. 5, 1977, abandoned.

[51] Int. Cl.³ .............................................. B01D 25/12
[52] U.S. Cl. ..................................................... 210/227
[58] Field of Search .................................. 100/194–198, 100/211; 210/224–231, 346, 347, 486

[56] References Cited

U.S. PATENT DOCUMENTS

| Re. 27,118 | 4/1971 | Juhasz | 210/225 X |
| 3,503,326 | 3/1970 | Juhasz et al. | 210/225 X |
| 3,737,041 | 6/1973 | Kitajima et al. | 210/228 |
| 3,888,769 | 6/1975 | Schotten et al. | 210/227 |
| 3,988,242 | 10/1976 | Kurita et al. | 210/227 |

FOREIGN PATENT DOCUMENTS

| 1401265 | 12/1965 | France | 210/231 |
| 2345193 | 10/1977 | France | 210/230 |

*Primary Examiner*—Robert H. Spitzer
*Attorney, Agent, or Firm*—Holman & Stern

[57] ABSTRACT

A filtration-compression type filter press comprising a fixed end plate and a movable end plate and compression filter plates suitably disposed therebetween. Each compression filter plate comprises a base plate having a central opening larger than a slurry feed port and a filter compression diaphragm in the form of two flexible fluid-tight sheets applied to the front and rear surfaces of the base plate and having uneven filter surfaces with a filter cloth piece applied thereto. The diaphragm is integrally formed with a cylindrical portion interconnecting the sheets and extending through the opening in the base plate to define the slurry feed port. A pressure chamber is formed between the base plate and each of the sheets. The compression filter plate has a pressure fluid feed channel communicating at least with the pressure chamber and a filtrate outlet channel open to its filter surface. A ring radially divided at least at one portion for preventing the displacement of the filter compression diaphragm relative to the base plate is fitted in the base plate opening around the cylindrical portion and held to the opening-defining inner periphery of the base plate axially thereof.

2 Claims, 9 Drawing Figures

FILTRATION-COMPRESSION TYPE FILTER PRESS

BACKGROUND OF THE INVENTION

This application is a Continuation-in-Part of Application Ser. No. 857,757, filed Dec. 5, 1977, now abandoned.

The present invention relates to a filter press of the so-called filtration-compression type wherein a slurry is fed under pressure and filtered by the feed pressure as a primary treatment and upon completion of the filtration the resulting filter cake remaining in each filter chamber is compressed by the expansion toward the associated filter chamber of the compression diaphragm which faces toward the filter chamber to effect further dehydration as a secondary treatment.

Among filter presses of this type is a well-known one wherein the surface of the compression diaphragm facing a filter chamber is made uneven for filtration and for compression, thereby simplifying the construction. My U.S. Pat. No. 3,988,242 discloses a filter press including a similar compression filter diaphragm composed of two flexible fluid-tight sheets covering the front and rear surfaces of a base plate. The sheets are connected together by a cylindrical portion extending through a central opening of the base plate and defining a slurry feed port. The portion defining the slurry feed port is rendered fluid tight by a simple construction so as to keep the pressure chamber between the base plate and the diaphragm completely out of communication with the filtration chamber provided between each two adjacent filter plates, whereby the functions of filtration and compression as well as the safety of the filter press are ensured. The compression diaphragm can be fitted to the base plate only by passing one of the flexible fluid-tight sheets in a rounded form through the base plate opening from one side thereof to the other side. To facilitate this procedure, the base plate opening is made larger than the outside diameter of the diaphragm cylindrical portion. To prevent the attendant displacement of the diaphragm relative to the base plate in a direction in parallel to the planar faces of these elements, a ring is fitted in the base plate opening around the cylindrical portion. Since one of the sheets must also be passed through the ring to fit the ring around the cylindrical portion, the ring used comprises radially divided two segments to facilitate this procedure.

The slurry feed port portion at the center of the filter plate is subjected to high pressure, for example, of about 40 kg/cm$^2$ or higher during the feed of the prefilt, whereas the cylindrical portion of the diaphragm is retained in the base plate opening by the ring which is merely fitted in the opening and which is therefore freely movable relative to the opening axially thereof. Consequently high pressure, when acting on the port portion, deforms the diaphragm cylindrical portion, which in turn displaces the ring axially thereof, thus producing increased resistance to the passage of the prefilt through the feed port. The cylindrical portion is therefore further deformed by being subjected to the resulting abnormal increase of the pressure. The diaphragm would then be forced into pressing contact with one end of the ring projecting from the base plate opening or with the opening edge of the plate at the other end of the ring. The diaphragm, consequently fatigued, would bulge progressively markedly, creating still increased resistance to the passage of the prefilt, hence a vicious cycle. As a result, the filter press fails to function properly in a short period of time. Even if it is desired to use the diaphragm for a prolonged period of time, cracks will develop in the cylindrical portion or in its neighboring portion relatively early to impair the fluid-tight separation between the pressure chamber and the filtration chamber and rendering the filter press inoperative. When the ring is in the form of divided two segments, the displacement of the ring and the fatigue of the diaphragm attendant thereon occur more markedly.

SUMMARY OF THE INVENTION

An object of the present invention is to provide a filtration-compression type filter press as disclosed in my U.S. Pat. No. 3,988,242, in which the cylindrical portion of the compression filter diaphragm and the ring fitting in the base plate opening around the cylindrical portion can be held to the base plate opening portion without necessitating a cumbersome fitting procedure, or impeding the flow of pressure fluid through the pressure chamber between the base plate and the diaphragm, or limiting the space available for the bulging of the diaphragm to ensure a satisfactory compression function, so that the cylindrical portion can be held in place with safety by the ring which is held engaged in place as if it were an integral part of the base plate, even when the diaphragm is subjected to high pressure, the filter press thus being made operable with high efficiency and high stability over a prolonged period of time.

Another object of this invention is to provide a construction whereby the pressure fluid used for the compression of cake is adapted to expel the filtrate after the compression for the recovery of the filtrate with improved efficiency.

According to the present invention, each of compression filter plates suitably disposed between a fixed end plate and a movable end plate comprises a base plate having a central opening considerably larger than the slurry feed port, and a filtration-compression diaphragm in the form of two flexible fluid-tight sheets to be fitted to the front and rear surfaces of the base plate and having uneven surfaces with a filter cloth piece attached thereto, the diaphragm being formed with a cylindrical portion which connects the sheets and which extends through the opening in the base plate and defines the slurry feed port, the diaphragm being adapted to be mounted on the base plate by wadding one of the flexible sheets, passing the wadded sheet through the opening in the base plate and unfolding the sheet. To facilitate the fitting of the diaphragm on the base plate, the opening is made sufficiently larger than the slurry feed port. Further to prevent the displacement of the diaphragm relative to the base plate due to the presence of a clearance in the base plate opening around the cylindrical portion, a displacement preventing ring is provided in the opening around the cylindrical portion. The ring is engaged at its outer periphery with the opening-defining inner periphery of the base plate axially thereof, whereby the ring can be held against any displacement even when comprising radially divided two segments for the ease of installation, thus acting as if it were an integral part of the base plate to hold the cylindrical portion with safety and protect the same from an abnormal external force and deformation. Consequently the cylindrical portion as well as the neighboring portion of the diaphragm is less prone to fatigue or bulging, affording fluid-tightness over a prolonged period of time and rendering the filter press operable with improved stability. Additionally the means for engaging the ring, being provided on the plate inner periphery, will in no way affect the diaphragm, permitting the pressure fluid to reach the cylindrical portion to freely bulge the diaphragm and thereby achieving still improved compression efficiency. The ring is held engaged in place by the fitting engagement of an annular groove formed in one of the ring outer periphery and the opening-defining inner periphery of the plate with an annular projection formed on the other. The ring may be made of metal or any other material having sufficient rigidity for the protection of the cylindrical portion. Rubbers are usable therefor. A rubber or like elastic ring, if cut radially thereof only at one portion, is easily fittable around the cylindrical portion when opened at the cut portion. The ring is also easily fittable into the opening by virtue of its elasticity. A metal ring can be fitted around the cylindrical portion with ease when radially divided into two. When such a ring is formed in its outer periphery with an annular groove and divided into two along the groove transversely of its axis, the ring is readily fittable into the base plate opening.

The filter press of this invention further includes at least a pressure fluid feed channel communicating with a pressure chamber provided between the base plate and the diaphragm and a filtrate outlet channel in the diaphragm which opens to the diaphragm filter surface, whereby the filter press is adapted to perform primary and secondary treatments or filtration and compression when the filter plates are clamped between the fixed and movable end plates. The filter plate is further provided with a pressure fluid bypass channel in communication with the feed channel and open to the diaphragm filter surface, the arrangement being such that the pressure fluid is valved to be admitted to the pressure chamber for the compression of cake and then bypassed to the filter surface through the bypass channel for forcing the filtrate out through the filtrate outlet channel.

Therefore, the filtrate separated by filtration and compression and remaining in the filter surface grooves and outlet channel is forcibly discharged by the bypassed pressure fluid, so that when the filter plates are opened for cake discharge, there is no remaining filtrate which would flow out. This ensures improved filtrate recovery efficiency. When dehydrated cakes are required, there is no danger of remaining filtrate flowing down to mix therewith and decreasing the dehydration efficiency.

Other features of the present invention will become more apparent from the following description and the accompanying drawings.

DESCRIPTION OF THE PREFERRED EMBODIMENT

Figure 1:
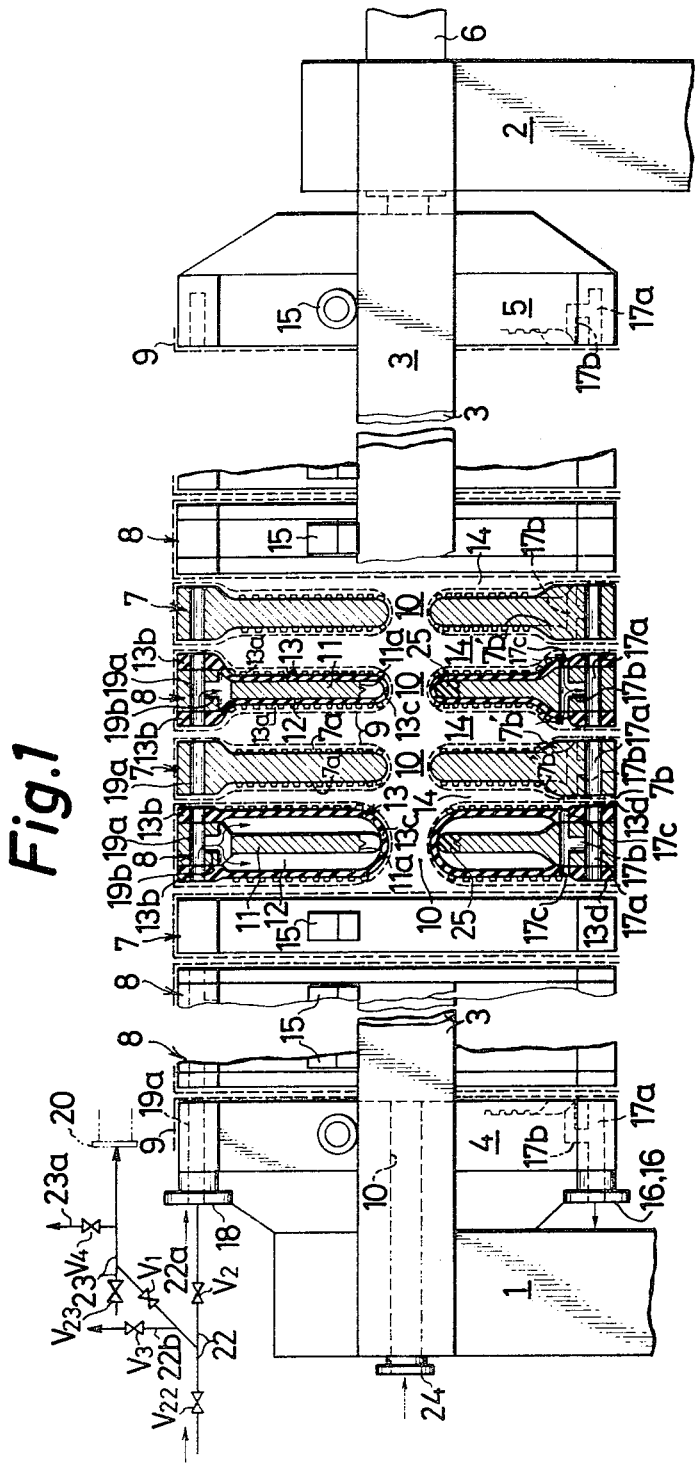
FIG. 1 is a side view, partly in section, of a filtration-compression type filter press showing an embodiment of the invention.
Figure 2:
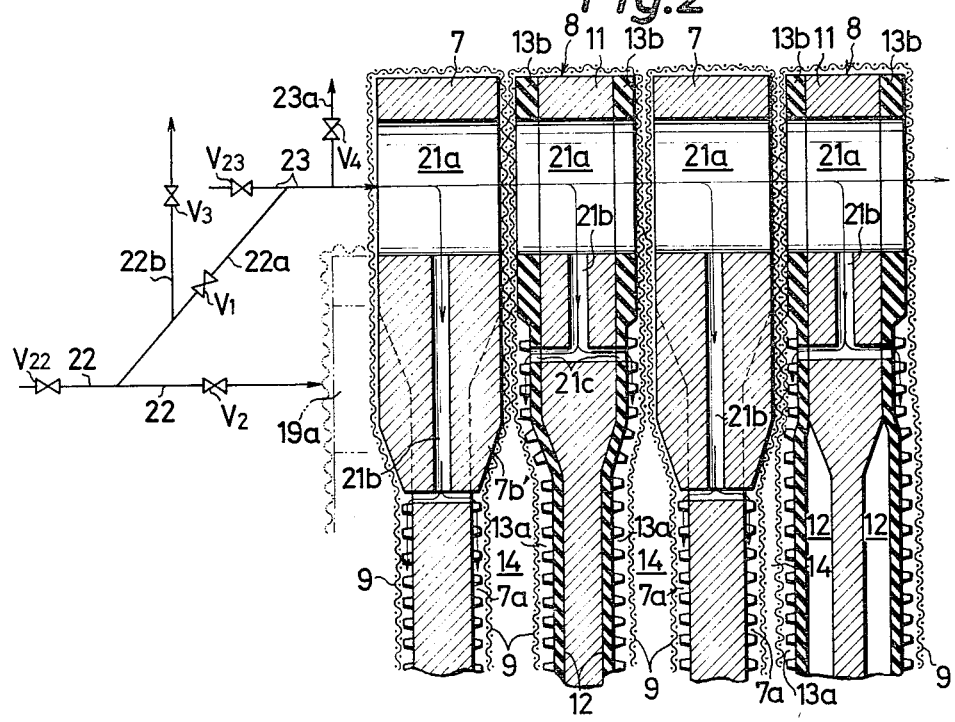
FIG. 2 is an enlarged view of a portion of FIG. 1 clearly showing the path of flow of pressure fluid.
Figure 5:
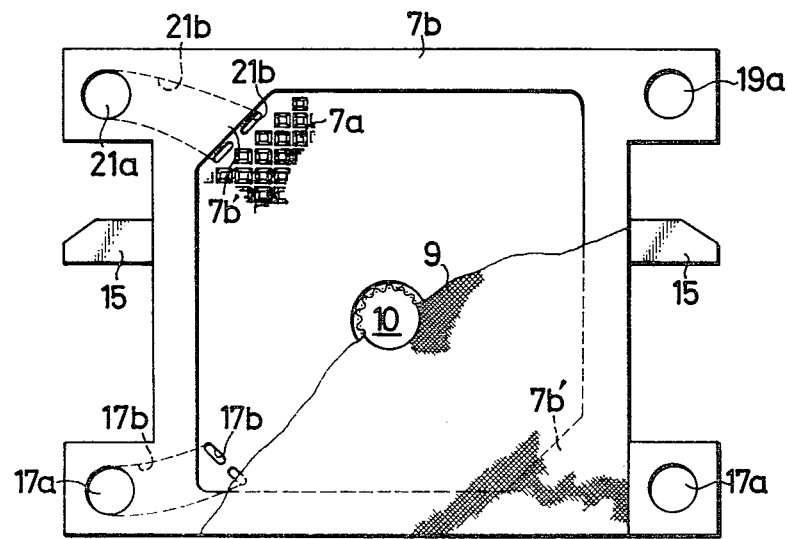
FIG. 5 is a front view, partly broken away, of an ordinary filter plate in FIG. 1.

With reference to the embodiment shown in FIGS. 1 to 6, indicated at 1 and 2 are machine frames which carry a pair of transversely spaced side bars 3. A fixed end plate 4 is provided at one machine frame, and on the other machine frame 2 there is provided a movable end plate 5 which can be advanced and retracted by a cylinder 6. The movable end plate 5, and filter plates 7 of usual construction and improved compression filter plates 8, alternately disposed between the movable and fixed end plates 5 and 4, are movably supported on the side bars 3 by handles 15 projecting from their lateral surfaces. Each filter plate 7 of usual construction, as shown in FIGS. 1, 2 and 5, has uneven filter surfaces 7a to which a filter cloth piece 9 is applied, whereas each compression filter plate 8, as shown in FIGS. 1 through 4, comprises a base plate 11 having an opening 11a sufficiently larger than a slurry feed port 10, and a filtration compression diaphragm 13 applied to the front and rear surfaces of the base plate to define pressure chambers 12 therebetween. The compression diaphragm 13 comprises flexible fluid-tight sheets 13b of rubber or the like having uneven surfaces 13a and applied to the front and rear surfaces of the base plate 11, and a cylindrical portion 13c extending through the opening 11a in the base plate 11, defining the slurry feed port 10 and interconnecting the sheets 13b. The diaphragm is fitted to the base plate 11 by folding one of the sheets 13b into two at the slurry feed port 10, wadding opposite sides around the slurry feed port 10, passing the wadded sheet 13b through the opening 11a in the base plate from one side thereof to the other side and unfolding the same. The sheet 13b wadded can be passed through the opening 11a with greater ease when bound as by a string. The compression filter plate 8 with the compression diaphragm 13 mounted on the base plate 11 has a filter cloth piece 9 applied to the filter surfaces 13a defined by the sheets 13b.

The fixed and movable end plates 4 and 5 are disposed adjacent the compression filter plates 8 and, although not shown, their opposed surfaces are formed with filter surfaces similar to the filter surfaces 7a of usual filter plate 7 and filter cloth pieces 9 are applied thereto.

The filter plates 7 and 8, when clamped between the fixed end plate 4 and the movable end plate 5 as a result of the advance of the latter, contact each other through the filter cloth pieces 9 as seen in FIG. 1 to define filtration chambers 14 between the filter surfaces 7a and 13a. Each filtration chamber 14 adjoins a pressure chamber 12 separated by a sheet 13b having a filter surface 13a.

The filter plates 7 and 8 have main filtrate outlet channels 17a which communicate with filtrate outlet ports 16 formed in the fixed end plate 4 at the lower opposite corners thereof when the filter plates are pressed into contact with each other. Each filter plate 7 has a filtrate outlet sub-channel 17b which communicates with the left-hand side filtrate outlet channel 17a shown in FIG. 5 and which opens to the filter surface 7a, while each filter plate 8 has a filtrate outlet sub-channel 17b in the base plate 11 which communicates with the right-hand side filtrate outlet channel 17a shown in FIG. 3 and which also communicates with the filter surface 13a through holes 17c formed in the sheet 13. The filtrate outlet channel 17a of the plate 8 extends through the base plate 11 and sheet 13b, opens to the marginal land 13d of the sheet 13b and is opposed to the outlet channel 17a which extends through the filter plate 7 and opens to the marginal land 7b thereof. These outlet channels 17a in the filter plates 7 and 8 communicate with each other when the lands 7b and 13d are pressed into contact with each other. The outlet sub-channel 17b in the filter plate 8 communicates with the outlet channel 17a within the base plate 11 and opens to a position on the marginal land of the base plate 11 opposed to the holes 17c in the sheets 13b and also opens to a corner of the filter surface 13b surrounded with the marginal land 13d through the holes 17c. The region of the filter surface 13a where the holes are formed is opposed to an enlargement 7b' of the marginal land 7b surrounding the filter surface 7a and is clamped between the enlargement and the base plate 11 when the filter plates 7 and 8 are pressed into contact with each othter, so that even if the compression diaphragm 13 is bulged as shown in the left-hand side of FIG. 1 section by feeding pressure fluid to the pressure chamber 12, the region of the sheet 13b where the holes 17c are formed will not separate from the base plate 11. Therefore, the holes 17c and outlet channels 17a, 17b do not spoil the fluid-tightness of the pressure chamber 12. The fixed end plate 4 has a filtrate outlet sub-channel 17b which opens to its filter surface 4a, and main filtrate outlet channels 17a which communicate directly with the filtrate outlet ports 16, the sub-channel 17b communicating with one of the channels 17a as in the case of the filter plates 7, while the movable end plate 5 has a filtrate outlet sub-channel 17b which opens to its filter surface 5a, and main filtrate outlet channels 17a communicating with the filtrate outlet ports 16 through the channels 17a in the plates 7, 8 and fixed end plate 4, the sub-channel 17b communicating with one of the channels 17a in the movable end plate (FIGS. 1, and 3 through 5).

Figure 3:
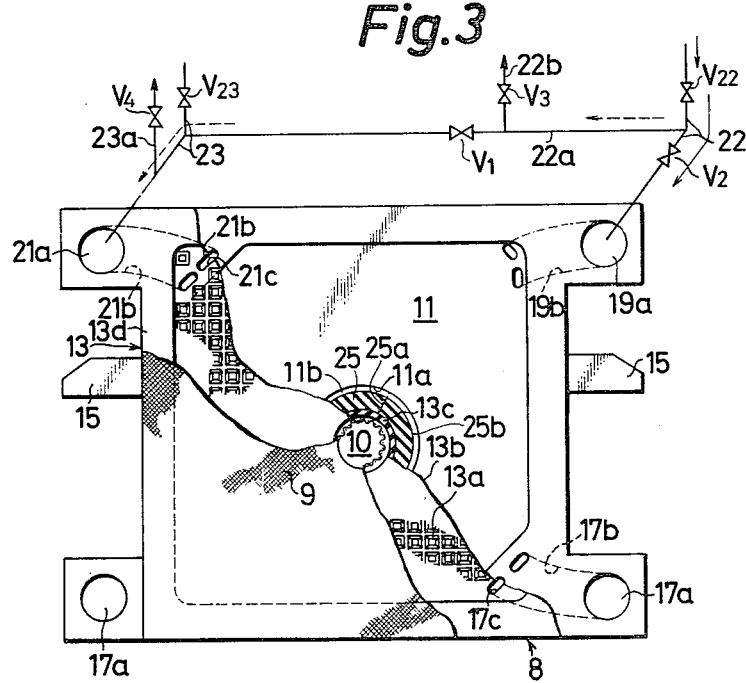
FIG. 3 is a front view, partly broken away, of a compression filter plate shown in FIG. 1.
Figure 4:
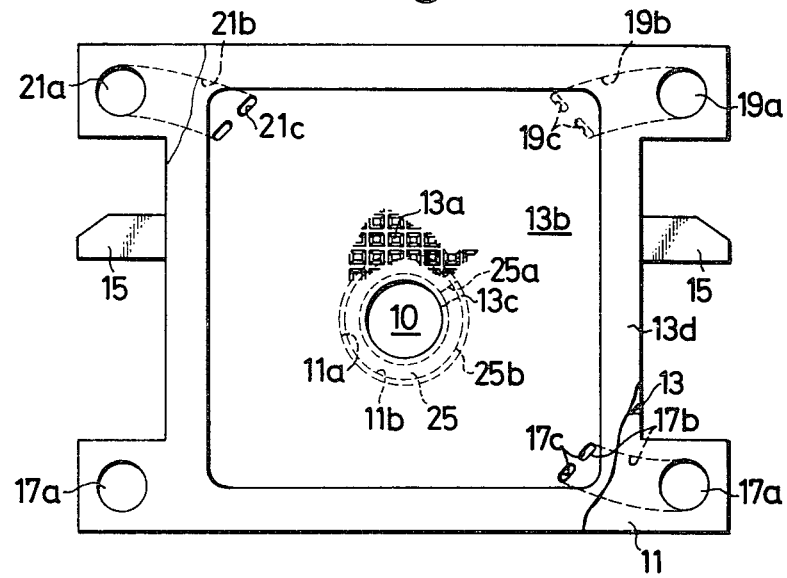
FIG. 4 is a front view of the filter plate of FIG. 3 with its filter cloth piece removed.

The filter plates 7, 8 and fixed and movable end plates 4, 5 have pressure fluid feed channels 19a which become continuous with each other and communicate with a pressure fluid feed port 19 formed at one upper corner of the fixed end plate 4 when these plates are pressed into contact with each other, the channels 19a opening to the marginal lands of the respective plates. Each filter plate 8 is formed with a pressure fluid feed sub-channel 19b communicating with the associated feed channel 19a within the base plate 11 and opening to the pressure chamber 12. Main dual-purpose feed channels 21a which communicate with a dual-purpose feed port 20 for washing water and pressure fluid formed at the other upper corner of the fixed end plate 4 also open to the marginal lands of the plates 7, 8 and end plates 4, 5. The filter plates 7, 8 are formed with dual-purpose feed sub-channels 21b which communicate with the feed channels 21a and open to the filter surfaces 7a and 13a. The dual-purpose feed channel 21b in each filter plate 8 opens to the filter surface 13a through through-holes 21c formed at a corner of the filter surface 13a which will be pressed against an enlargement 7b' of the associated filter plate 7. A pressure fluid feed line 22 connected to the pressure fluid feed port 18 has its branch line 22a connected to a washing liquid feed line 23 connected to the dual-purpose feed port 20. Main valves V22 and V23 are located downstream of the branching point of the branch line 22a of the line 22 and downstream of a point at which the branch line is connected to the washing liquid line 23, respectively. A valve V1 is provided intermediate between the ends of the branch line 22a and a valve V2 is provided between the branching point of the branch line 22a and the feed port 18. A first discharge line 22b having a valve V3 therein is provided between the branching point of the line 22a and the valve V1, while a second discharge line 23a having a valve V4 therein is connected between the branching point of the washing liquid feed line 23 and the feed port 20 (FIGS. 1 through 3). The numeral 24 in FIG. 1 designates a slurry feed port provided in the machine frame 1 and communicating with the individual filter chambers 14 through the slurry feed ports 10 in the fixed end plate 4 and filter plates 7 and 8.

For filtration, the movable end plate 5 is advanced by the cylinder 6 to clamp the filter plates 7 and 8 between the movable and fixed end plates 4 and 5 as seen in FIG. 1. In this state, a slurry is fed from the feed port 24 to the individual filter chamber 14. The slurry fed to the filter chambers 14 is filtered under the feed pressure as it tends to flow through the filter cloth pieces 9 to the filter surfaces 7a and 13a defining the opposite lateral walls of the filtration chambers 14. The filtrate which has flowed to the filter surfaces 7a and 13a flows down along the filter surfaces 7a and 13a to enter the filtrate outlet sub-channels 17b which open to the filter surfaces 7a and 13a and it is finally discharged through the filtrate outlet ports 16.

Upon the lapse of a predetermined period of filtration, the feed of slurry is cut off and pressure fluid is fed to the feed port 18 through the pressure fluid feed line 22. In this case, all the valves except the valves V22 and V2 remain closed, and the pressure fluid being fed flows from the main pressure fluid feed channels 19a, which are now continuous with each other, into the individual pressure fluid feed sub-channels 19b and then into the individual pressure chambers 12, whereby the filtration-compression diaphragm 13 of each filter plate 18 is bulged from a first position shown at the right-hand side of the FIG. 1 section wherein the sheets 13b are in intimate contact with the base plate 11 to a second position shown at the left-hand side of said section wherein they are separated from the base plate 11, thereby compressing the cake (not shown) for further dehydration resulting from said filtration and remaining in the filtration chambers 14. The resulting filtrate is discharged via the same path as in the case of the preceding filtrate.

Upon completion of the dehydration, the valve V22 is closed while leaving the valve V2 as it is, and the valve V1 is opened. As a result, the main pressure fluid feed channels 19a communicating with the washing liquid and pressure fluid feed channels 21a through portions of the feed lines 22 and 23 and the branch line 22a, so that the pressure fluid fed to the pressure chambers 12 flows back until it enters the dual-purpose feed channels 21a. Then it flows through the dual-purpose feed sub-channels 21b to the filter surfaces 7a and 13a of the filter plates 7, 8, so that the filtrate remaining in the filtrate grooves in the filter surfaces 7a and 13a is expelled through the filtrate outlet channels 17b, 17a. Thus the filtrate recovery efficiency is improved, and when cake is required there is no possibility that the filtrate remaining on the surfaces 7a and 13a from which it is to be recovered will mix in the cake to decrease the dehydration efficiency. Further, the pressure fluid for expelling the filtrate is mixed with the filtrate and discharged therewith. In this case, if compressed air is used as the pressure fluid, the resulting mixture is a gas-liquid one and the air will spontaneously dissipate without any trouble.

When this filtrate expelling operation is not to be performed, only the valves V2, V3 and V4 are opened after the dehydration of cake so as to allow the pressure fluid used for compression to be discharged through the first and second discharge lines 22b and 23a.

The series of operations described above, which constitutes one cycle of filtration, is repeated for filtration of successive batches of slurry. Each time the slurry is fed, the valves V3 and V4 are kept open for a predetermined period of time to enable the slurry being fed to release the air remaining in the filtration chambers 14. The timely operation of the individual valves may be automatically effected along with filtration according to a predetermined program.

When filtration is repeatedly effected, the filter cloth pieces 9 will gradually clog, thus decreasing the filtration efficiency. In order to overcome this problem, the filter cloth pieces 9 are reversely washed periodically or when required during the progress of the program. This reverse washing is effected by opening the valve V23 alone to feed washing liquid from the feed port 20 through the washing liquid feed line 23. The washing liquid thus fed flows through the main dual-purpose feed channels 21a and then through the dual-purpose feed sub-channels 21b to appear at the surfaces 7a and 13a. The slurry feed channels are opened as washing liquid outlet channels are closed so that the air therein will not be forced out. The supplied washing liquid flows through the filter cloth pieces 9 in a direction opposite to that for the filtrate, i.e., from the filter surfaces 7a, 13a to the chambers 14. This reverse flow of washing liquid removes the remnant which sticks to the filter cloth pieces 9 or with which the latter clog, and washes it out of the filter press via the slurry feed channels. Therefore, it goes without saying that the slurry feed channels will be selectively connected to the slurry feed source and the washing liquid outlet port.

During each filtration, the filtration-compression diaphragms 13 are expanded and contracted once, whereby the cylindrical portions 13c would be fatigued to become incapable of sufficiently expanding and contracting, interfering with the flow of slurry. However, each filtration-compression diaphragm 13 is an open body comprising two sheets 13b connected at the slurry feed opening 10 and is easy to form, and the cylindrical portion 13c defining the slurry feed opening 10 can be made to have a thickness gradually increasing from the sheet 13b to avoid such fatigue due to usual expansion. Since it is formed as a unit, no problem will arise in its fluid-tightness at the slurry feed opening portion 10. The filter press is therefore properly operable for filtration and compression with high safety.

Figure 6:
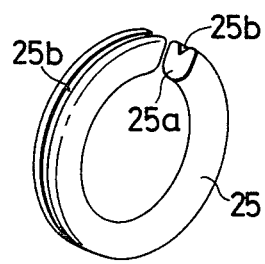
FIG. 6 is a perspective view showing a displacement preventing ring.

A displacement preventing ring 25 shown in FIG. 6 is fitted in the base plate opening 11a around the cylindrical portion 13c of the diaphragm 13 interconnecting the sheets 13b and providing the feed port 10 to prevent the displacement of the diaphragm 13 relative to the base plate 11. The ring 25 is made of material having suitable rigidity and elasticity such as natural rubber. The ring is radially cut at one portion as seen in FIG. 6 and is easily fittable around the cylindrical portion 13c when opened at the cut portion 25a by virtue of its elasticity. The ring has an annular groove 25b in its outer periphery. When the cylindrical portion 13c has been fitted in the opening 11a with one sheet 13b passing therethrough, the ring fits in the opening 11a, with an annular projection 11b on the inner periphery defining the opening 11a in fitting engagement with the annular groove 25b elastically, whereby the ring 25 is held in place against axial displacement. The provision of the ring 25 will in no way make the diaphragm difficult to install in place, therefore.

The ring 25, which per se is held engaged in the base plate opening 11a against displacement, retains the diaphragm cylindrical portion 13c in position with high stability, thus obviating the displacement of the diaphragm 13 relative to the base plate 11 in a direction in parallel to their planes and effectively preventing the axial deformation of the cylindrical portion 13c that would occur when the feed port portion 10 is subjected to high pressure. Accordingly the cylindrical portion 13c as well as its neighboring portion will not be deformed excessively or pressed as against the edge of the opening-defining periphery and is less susceptible to fatigue or swelling, retaining high fluid-tightness to separate the pressure chamber 12 from the filtration chamber 14 and perform repeated expansion and contraction in the usual manner. The filter press is therefore operable for filtration and compression with high safety over a prolonged period of time. Rings 25 of varying thicknesses may be prepared for selective use, whereby the same base plate 11 is usable with varying feed port sizes. The ring further permits the pressure fluid to freely reach the cylindrical portion, rendering the diaphragm free to expand or contract even at the feed port portion 10 to effect dehydration with improved efficiency.

Figure 7:
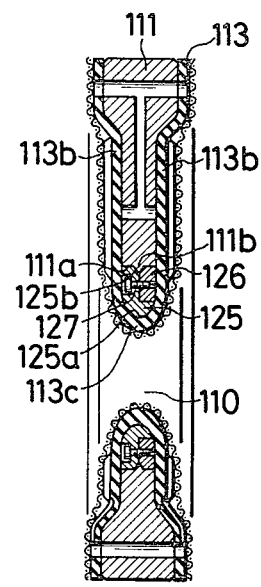
FIG. 7 is a view in section showing a modified displacement preventing ring as incorporated in a filter plate.
Figure 8:
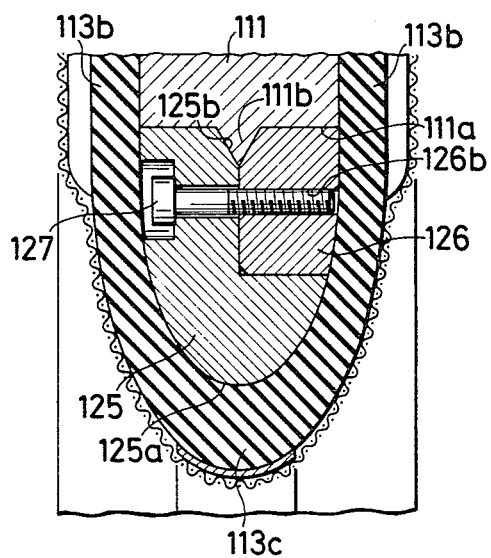
FIG. 8 is a fragmentary enlarged view of FIG. 7.
Figure 9:
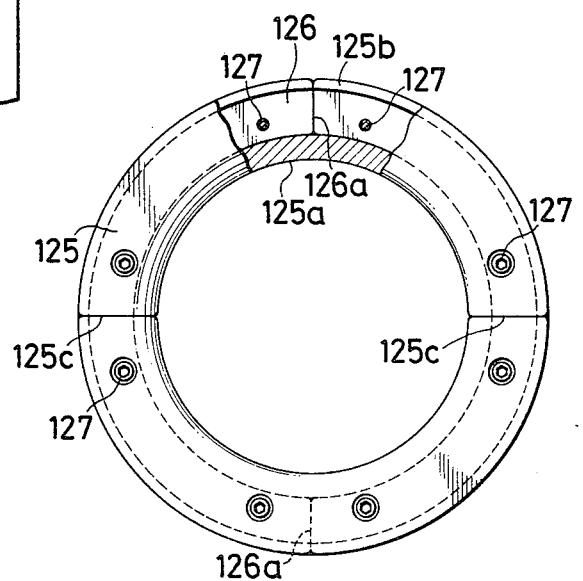
FIG. 9 is a front view showing the ring of FIGS. 7 and 8.

According to the embodiment shown in FIGS. 7 to 9, a metal ring 125 and an auxiliary metal ring 126 partially fitting to the front face of the ring 125 are fitted in the opening 111a of the base plate 111 around a cylindrical portion 113c of a compression filter diaphragm 113 which portion 113c interconnects the flexible fluid-tight sheet components 113b of the diaphragm 113. The ring 125 has an inner periphery 125a conforming to the outer peripheral shape of the cylindrical portion 113c. A projection 111b formed on the inner periphery of the base plate 111 defining its opening 111a engages in an annular groove 125b provided in the outer periphery of the assembly of the rings 125 and 126. The rings 125 and 126 each comprise two radially divided two segments 125c and 126a which are fastened together by bolts 127 and are angularly displaced from each other by 90 degrees. The bolts 127 passing through the ring 125 and screwed into threaded holes 126b of the ring 126 may be reversely screwed into the former ring 125. The rings 125 and 126 can be fitted in place and fastened together with one sheet 113b passed through the opening 111a. Nuts are usable in place of the threaded holes 126b for the bolts 127.

According to this embodiment, the rings 125 and 126, when installed in place, hold the cylindrical portion 113c with improved effectiveness by virtue of their high rigidity. The rings 125 and 126 are easily installable because they are separate along the annular groove 125b and are each radially divided into two segments as mentioned above.

What is claimed is:

1. A filtration type filter press comprising compression filter plates suitably disposed between a fixed end plate and a movable end plate and each comprising a base plate centrally formed with an opening larger than a slurry feed port and a filtration-compression diaphragm, the diaphragm including two flexible fluid-tight sheets fitted to the front and rear surfaces of the base plate and having uneven surfaces with a filter cloth piece applied thereto, the diaphragm being integrally formed with a cylindrical portion interconnecting the sheets and extending through the opening in the base plate to define the slurry feed port, the filter plate including a pressure chamber formed between the base plate and each of the sheets and having at least a pressure fluid feed main channel communicating with the pressure chamber and a filtrate outlet channel opened to the filter surface of the diaphragm, the filter plate further comprising a displacement preventing ring made of metal fitting in the base plate opening around the cylindrical portion of the diaphragm, an annular groove formed in the outer periphery of said ring engaging an annular projection on the opening-defining inner periphery of the base plate to hold the ring against axial displacement, said ring being divided into segments both radially and transversely of its axis along the annular groove, said segments being fastened to each other by bolts.

2. A filter press as defined in claim 1 wherein the radially divided two portions of one segment are fastened to the radially divided two portions of the other segment as displaced from the latter two portions.

* * * * *